US009791613B2

(12) United States Patent
Shei et al.

(10) Patent No.: US 9,791,613 B2
(45) Date of Patent: Oct. 17, 2017

(54) DISPLAY DEVICE

(71) Applicant: E Ink Holdings Inc., Hsinchu (TW)

(72) Inventors: Tsai-Wei Shei, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 100 days.

(21) Appl. No.: 14/937,877

(22) Filed: Nov. 11, 2015

(65) Prior Publication Data
US 2016/0238773 A1 Aug. 18, 2016

(30) Foreign Application Priority Data

Feb. 17, 2015 (TW) .............................. 104105640 A

(51) Int. Cl.
*F21V 7/04* (2006.01)
*F21V 8/00* (2006.01)

(52) U.S. Cl.
CPC ........... *G02B 6/005* (2013.01); *G02B 6/0036* (2013.01); *G02B 6/0076* (2013.01)

(58) Field of Classification Search
CPC .. G02B 6/0036; G02B 6/0038; G02B 6/0045; G02B 6/005; G02B 6/0063; G02B 6/0066; G02B 6/0075
See application file for complete search history.

(56) References Cited

U.S. PATENT DOCUMENTS

| 7,075,597 B2 | 7/2006 | Wen et al. |
| 2005/0083713 A1 | 4/2005 | Boks |
| 2008/0101092 A1* | 5/2008 | Lee ...................... G02B 6/0073 362/628 |
| 2011/0096564 A1* | 4/2011 | Shin ..................... G02B 6/0061 362/607 |
| 2011/0141388 A1 | 6/2011 | Park et al. |
| 2011/0141394 A1 | 6/2011 | Kim et al. |
| 2012/0113158 A1* | 5/2012 | Goto .................... G02B 6/0038 345/690 |

(Continued)

FOREIGN PATENT DOCUMENTS

| TW | 201142387 | 12/2011 |
| TW | 201432329 | 8/2014 |

OTHER PUBLICATIONS

"Office Action of Taiwan Counterpart Application", dated Sep. 19, 2016, p. 1-p. 4, in which the listed references were cited.

*Primary Examiner* — Ali Alavi
(74) *Attorney, Agent, or Firm* — Jianq Chyun IP Office

(57) ABSTRACT

A display device includes a first light source module, a display panel and a transparent filling. The first light source module includes at least one first light source and a first light guide plate (LGP). The first LGP includes a first light-incident surface and a first light-emitting surface. The first light-emitting surface connects the first light-incident surface. The display panel is disposed adjacent to the first LGP. The transparent filling connects the display panel and the first light-emitting surface. The refractive index of the transparent filling is smaller than that of the first LGP and smaller than or equal to that of a surface material of the display panel. The first light source emits a first light beam into the first LGP through the first light-incident surface, and the first light beam is emitted from the first light-emitting surface and transmitted to the display panel through the transparent filling.

15 Claims, 2 Drawing Sheets

(56) References Cited

U.S. PATENT DOCUMENTS

| | | |
|---|---|---|
| 2012/0163021 A1 | 6/2012 | Bohn et al. |
| 2013/0051000 A1 | 2/2013 | Yu et al. |
| 2014/0042475 A1 | 2/2014 | Park et al. |
| 2014/0043377 A1* | 2/2014 | Tanaka ................. G02B 6/0053 345/690 |
| 2014/0139785 A1 | 5/2014 | Park et al. |
| 2014/0286047 A1 | 9/2014 | Bohn et al. |

* cited by examiner

DISPLAY DEVICE

CROSS-REFERENCE TO RELATED APPLICATION

This application claims the priority benefit of Taiwan application Ser. No. 104105640, filed on Feb. 17, 2015. The entirety of the above-mentioned patent application is hereby incorporated by reference herein and made a part of this specification.

BACKGROUND OF THE INVENTION

[Field of the Invention]

The invention relates to an electronic device and more particularly relates to a display device.

[Description of Related Art]

A transparent display panel refers to a display panel having a certain degree of transparency and is capable of clearly displaying the background behind the panel, while presenting image frames on both surfaces, providing a double-sided display effect. The transparent display panel is not only suitable, for example, in portable electronic products, such as electronic eyeglasses, but is also suitable for a variety of applications, such as windows in buildings, car windows and shop windows. Besides the original transparent display function, there is even more potential for development as information display in the future, thus receiving attention in the market.

When presenting double-sided display function, current transparent displays often require assistance from external environmental light source in order to clearly present the image frames. However, when there is no assistance from environmental light source, the image frames presented by the transparent displays often cannot be read by users, thereby causing inconvenience in usage.

SUMMARY OF THE INVENTION

The invention provides a display device, which provides a good transparent display screen.

The display device of an embodiment of the invention includes a first light source module, a display panel and a transparent filling. The first light source module includes at least a first light source and a first light guide plate (LGP). The first LGP includes a first light-incident surface and a first light-emitting surface, and the first light-emitting surface connects the first light-incident surface. The display panel is disposed adjacent to the first LGP, and the first light-emitting surface faces the display panel. The transparent filling connects the display panel and the first light-emitting surface. The refractive index of the transparent filling is smaller than the refractive index of the first LGP and smaller than or equal to the refractive index of a surface material of the display panel. The first light source emits a first light beam into the first LGP through the first light-incident surface, and the first light beam is then emitted from the first light-emitting surface and transmitted to the display panel through the transparent filling.

In an embodiment of the invention, the display device further includes a second light source module, including at least one second light source and a second light guide plate (LGP). The second LGP includes a second light-incident surface and a second light-emitting surface, and the second light-emitting surface connects the second light-incident surface. The second light-emitting surface faces the display panel. The display panel is positioned between the first light-emitting surface and the second light-emitting surface. The at least one second light source emits a second light beam into the second LGP through the second light-incident surface, and the second light beam is emitted from the second light-emitting surface and transmitted to the display panel.

The display device of an embodiment of the invention includes a first light source module, a second light source module and a display panel. The first light source module includes at least one first light source and a first light guide plate (LGP). The first LGP includes a first light-incident surface and a first light-emitting surface, and the first light-emitting surface connects the first light-incident surface. The second light source module includes at least one second light source and a second light guide plate (LGP). The second LGP includes a second light-incident surface and a second light-emitting surface, and the second light-emitting surface connects the second light-incident surface. The display panel is disposed between the first light-emitting surface and the second light-emitting surface, and the first light-emitting surface and the second light-emitting surface face the display panel. The first light source emits a first light beam into the first LGP through the first light-incident surface, and the first light beam is emitted from the first light-emitting surface and transmitted to the display panel. The second light source emits a second light beam into the second LGP through the second light-incident surface, and the second light beam is emitted from the second light-emitting surface and transmitted to the display panel.

In an embodiment of the invention, the first light-emitting surface has a plurality of optical microstructures.

In an embodiment of the invention, the first light-emitting surface and the second light-emitting surface both have a plurality of optical microstructures.

In an embodiment of the invention, the transparent filling is further disposed between the first LGP and the display panel and between the second LGP and the display panel, and the transparent filling connects the display panel to the first light-emitting surface and the second light-emitting surface.

In an embodiment of the invention, the first LGP and the second LGP have the same material.

In an embodiment of the invention, the display device further includes a control unit at least electrically connecting the first light source module and the second light source module. The control unit respectively controls a switch and brightness of the first light source and the second light source.

In an embodiment of the invention, the display device is a transmissive liquid crystal display (LCD) panel, a semi-transmissive liquid crystal display panel, or an electrophoresis display panel.

In an embodiment of the invention, the transparent filling is in a liquid state, a gaseous state, a solid state, or a mixture thereof.

Accordingly, due to having the first light source module, the display panel and the transparent filling, the display device provided by embodiments of the invention allows the first light beam provided by the first light source module to effectively serve as the light source of the display panel, so that the image frame displayed by the display panel is clearly presented. In another aspect, since the display device provided by embodiments of the invention has the first light source module, the second light source module and the display panel, a good double-sided display effect is presented through the matching of double-sided light emission.

To make the above and other features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
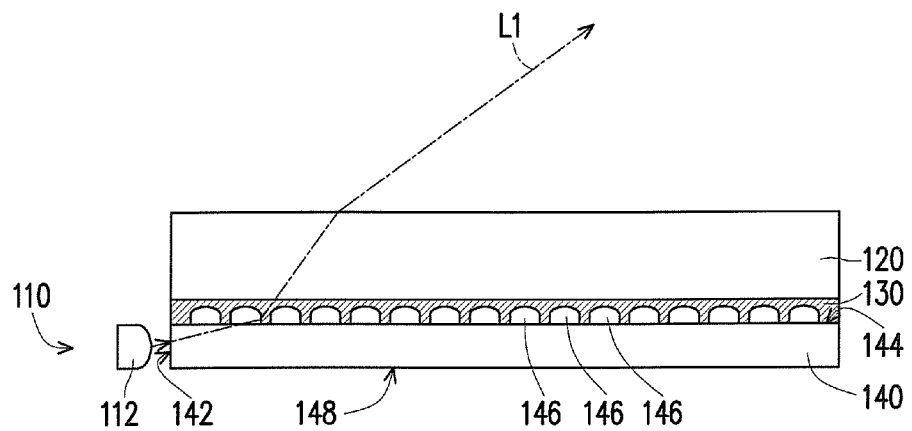
FIG. 1 is a cross-sectional view of a display device according to the first embodiment of the invention.

FIG. 1 is a cross-sectional view of a display device according to the first embodiment of the invention. Referring to FIG. 1, in the first embodiment of the invention, a display device 100 includes a first light source module 110, a display panel 120 and a transparent filling 130. The first light source module 110 includes at least one first light source 112 and a first light guide plate (LGP) 140. The first LGP 140 includes a first light-incident surface 142 and a first light-emitting surface 144, and the first light-emitting surface 144 connects the first light-incident surface 142. More specifically, the first LGP 140 further includes a first surface 148, wherein the first surface 148 is opposite to the first light-emitting surface 144, and the first light-incident surface 142 connects the first light-emitting surface 144 and the first surface 148. The display panel 120 is disposed adjacent to the first LGP 140, and the first light-emitting surface 144 faces the display panel 120. The transparent filling 130 connects the display panel 120 and the first light-emitting surface 144. The refractive index of the transparent filling 130 is smaller than the refractive index of the first LGP 140 and smaller than or equal to the refractive index of a surface material of the display panel 120. The first light source 112 emits a first light beam L1 into the first LGP 140 through the first light-incident surface 142, and the first light beam L1 is then emitted from the first light-emitting surface 144 and transmitted to the display panel 120 through the transparent filling 130.

In other words, in the embodiment, the first LGP 140, the transparent filling 130, and the surface material of the display panel 120 satisfy: $n_3 < n_1$ and $n_3 \leq n_2$, wherein $n_1$ is the refractive index of the first LGP 140, $n_2$ is the refractive index of the surface material of the display panel 120, and $n_3$ is the refractive index of the transparent filling 130. The display panel 120 is, for example, a transmissive liquid crystal display panel, and the surface material of the display panel 120 is, for example, a material of a polarizer forming a surface of the transmissive liquid crystal display panel, but the invention is not limited thereto. In other embodiments of the invention, the display panel can also be a semi-transmissive liquid crystal display panel, or an electrophoresis display panel, and the surface of the display panel can also be a light transmissive element, such as a polarizer or a transparent substrate, matching these display panels.

Therefore, since the display device 100 of the first embodiment of the invention includes the first light source module 110, the display panel 120 and the transparent filling 130, through such configuration and optical properties thereof, the first light beam L1 provided by the first light source module 110 is effectively transmitted to the display panel 120 and becomes an image frame, thereby allowing a user to view a good image.

More specifically, referring to FIG. 1, in the embodiment, the first light-emitting surface 144 has a plurality of optical microstructures 146, wherein the optical microstructures 146 are formed at the first light-emitting surface 144 to destroy the total reflection phenomenon of the first light beam L1 emitted by the first light source 112. In other words, after the first light beam L1 emitted by the first light source 112 enters the first LGP 140, as long as the first light beam L1 is transmitted to the first light-emitting surface 144, the optical microstructures 146 on the first light-emitting surface 144 reduce an incident angle of the first light beam L1, such that the first light beam L1 easily passes through the first light-emitting surface 144, allowing the first light source module 110 to effectively provide light source to the display panel 120. In the embodiment, the optical microstructures 146 are, for example, formed by the same material as the first LGP 140, but the invention is not limited thereto.

In another aspect, in the embodiment, the transparent filling 130 is, for example, in a liquid state, a gaseous state, a solid state, or a mixture thereof. More specifically, the transparent filling 130 in the embodiment is, for example, a transparent colloid, first coated between the display panel 120 and the first light-emitting surface 144, wherein configuration is completed after solidification, namely, the solid state, but the invention is not limited thereto. In other embodiments, the transparent filling 130 can also be other gases and liquids having an appropriate refractive index accommodated by a cavity, or other transparent mixtures suitable for configuration thereto.

Figure 2:
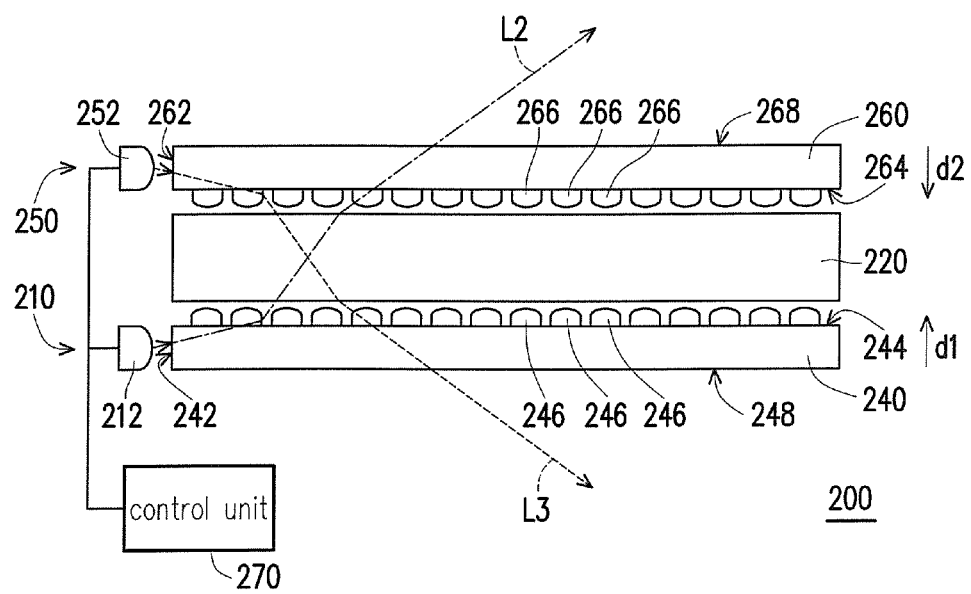
FIG. 2 is a cross-sectional view of a display device according to the second embodiment of the invention.

FIG. 2 is a cross-sectional view of a display device according to the second embodiment of the invention. Referring to FIG. 2, in the second embodiment of the invention, a display device 200 includes a first light source module 210, a second light source module 250 and a display panel 220. The first light source module 210 includes at least one first light source 212 and a first light guide plate (LGP) 240. The first LGP 240 includes a first light-incident surface 242 and a first light-emitting surface 244, and the first light-emitting surface 244 connects the first light-incident surface 242. The second light source module 250 includes at least one second light source 252 and a second light guide plate (LGP) 260, wherein the second LGP 260 includes a second light-incident surface 262 and a second light-emitting surface 264, and the second light-emitting surface 264 connects the second light-incident surface 262. More specifically, the first LGP 240 further includes a first surface 248, wherein the first surface 248 is opposite to the first light-emitting surface 244, and the first light-incident surface 242 connects the first light-emitting surface 244 and the first surface 248. The second LGP 260 further includes a second surface 268, wherein the second surface 268 is opposite to the second light-emitting surface 264, and the second light-incident surface 262 connects the second light-emitting surface 264 and the second surface 268. The display panel 220 is disposed between the first light-emitting surface 244 and the second light-emitting surface 264, and the first light-emitting surface 244 and the second light-emitting surface 264 face the display panel 220. The first light source 212 emits a first light beam L2 into the first LGP 240 through the first light-incident surface 242, and the first light beam L2 is emitted from the first light-emitting surface 244 and transmitted to the display panel 220. The second light source 252 emits a second light beam L3 into the second LGP 260 through the second light-incident surface 262, and the second light beam L3 is emitted from the second light-emitting surface 264 and transmitted to the display panel 220. It is worth noting that for clarity of the light beams L2 and L3 illustrated in FIG. 2, the overall optical path is illustrated, for example, after the light beam is transmitted to the display panel 220, wherein an image light beam converted from an image then passes through the opposite light guide plate, which should not be construed as a limitation to the invention.

In other words, in the embodiment, the display device 200 includes both the first light source module 210 and the second light source module 250, and thus, through the matching of the two light source modules, the image frame displayed by the display panel 220 can be viewed at two directions d1 and d2, providing a good double image frame effect.

More specifically, the display device 200 of the embodiment further includes a control unit 270, at least electrically connecting the first light source module 210 and the second light source module 250. The control unit 270 is configured to respectively control a switch (i.e. the on and off) and brightness of the first light source 212 and the second light source 252. In the embodiment, the control unit 270, for example, switches the display device 200 to a first mode or a second mode. In the first mode, the control unit 270 switches off the first light source 212 and switches on the second light source 252. In the second mode, the control unit 270 switches off the second light source 252 and switches on the first light source 212. In other words, in the first mode, the control unit 270 uses the second light source module 250 as a backlight source, such that a user receives the second light beam L3, that is, allowing the user to view a good image frame at the first surface 248 from the direction d1. In the second mode, the control unit 270 uses the first light source module 210 as a backlight source, such that a user receives the first light beam L2, that is, allowing the user to view a good image frame at the second surface 268 from the direction d2, providing a good double-sided display function. The control unit 270 can also switch on the first light source 212 and the second light source 252 at the same time to achieve a required light source effect according to surrounding environment or screen requirements. The control unit 270 can also adjust brightness of the first light source 212 and the second light source 252, in order to match an appropriate light source for presenting a good image frame.

In another aspect, in the embodiment, the first light-emitting surface 244 has a plurality of optical microstructures 246, and the second light-emitting surface 264 has a plurality of optical microstructures 266. Therefore, the first light beam L2 emitted by the first light source 212 easily passes through the first light-emitting surface 244, and the second light beam L3 emitted by the second light source 252 easily passes through the second light-emitting surface 264, such that the first light source module 210 in the second mode effectively provides light source to the display panel 220, and the second light source module 250 in the first mode effectively provides light source to the display panel 220.

The following paragraphs describe other embodiments. It should be noted that the following embodiments adopt the reference numerals of elements and partial content of the above embodiments, wherein the same reference numerals are adopted to indicate the same or similar elements, and descriptions of the same technical content are omitted. Regarding descriptions of the omitted portions, the above embodiments can be referred, and the descriptions are not repeated in following embodiments.

Figure 3:
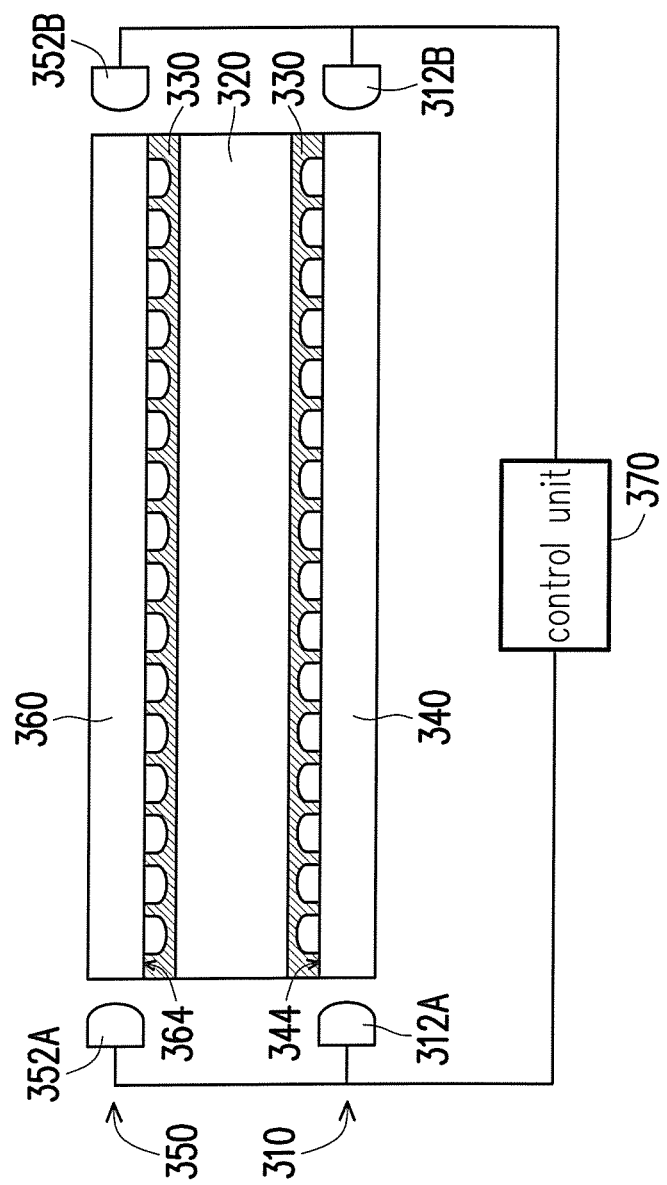
FIG. 3 is a cross-sectional view of a display device according to the third embodiment of the invention.

FIG. 3 is a cross-sectional view of a display device according to the third embodiment of the invention. Referring to FIG. 3, a display device 300 is generally similar to the display device 200, wherein a main difference between the two is that: in this embodiment, the display device 300 further includes a transparent filling 330 disposed between a first light guide plate (LGP) 340 and a display panel 320 and between a second light guide plate (LGP) 360 and the display panel 320, and the transparent filling 330 connects the display panel 320 to a first light-emitting surface 344 and a second light-emitting surface 364. The refractive index of the transparent filling 330 is smaller than the refractive index of the first LGP 340 and the second LGP 360, and smaller than or equal to the refractive index of a surface material of the display panel 320. In other words, through configuration of the transparent filling 330 and optical properties thereof, light beams emitted by first light sources 312A and 312B and second light sources 352A and 352B more easily emit from the first light-emitting surface 344 and the second light-emitting surface 364, respectively.

In another aspect, in this embodiment, a first light source module 310 has the first light source 312A and the first light source 312B, and a second light source module 350 has the second light source 352A and the second light source 352B. A control unit 370 controls switches of the first light source 312A, the first light source 312B, the second light source 352A, and the second light source 352B at the same time, thereby providing a good double-sided display effect. In other words, in embodiments of the invention, a quantity of first light source and second light source can be appropriately adjusted according to requirements.

In the above embodiment of the invention, the first LGP 340 and the second LGP 360 have, for example, the same material, but the invention is not limited thereto. In other embodiments, an appropriate light guide plate can be chosen to serve as the first LGP 340 and the second LGP 360 according to respective requirements on a double-sided display. It is worth noting that, in embodiments of the invention, the first light source and the second light source are, for example, light emitting diodes (LEDs), but the invention is not limited thereto. In other embodiments, a light-emitting element can also be an organic light emitting diode (OLED), laser diode (LD), cold cathode fluorescent lamp (CCFL), or other light-emitting elements suitable for emitting light. In another aspect, the light-emitting element is, for example, a linear light source, namely, a light-emitting bar composed of light emitting diodes, but the invention is not limited thereto. In other embodiments, the light-emitting element can also be a plurality of light emitting diodes arranged in an array or a plurality of point light sources.

In summary of the above, due to having the first light source module, the display panel and the transparent filling, the display device provided by embodiments of the invention allows the first light beam emitted by the first light source in the first light source module to more easily emit from the first light-emitting surface, such that the first light beam provided by the first light source module effectively serves as the light source of the display panel to clearly present the image frame displayed by the display panel. In another aspect, since the display device provided by embodiments of the invention has the first light source module, the second light source module and the display panel, through the matching of the first light source and the second light source, a user has a good backlight light source when viewing the display device from both directions, and a good double-sided display effect is presented through the matching of double-sided light emission.

Although the present invention has been described with reference to the above embodiments, it will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A display device, comprising:
   a first light source module, comprising a first light source and a first light guide plate, wherein the first light guide plate comprises a first light-incident surface and a first light-emitting surface connected to the first light-incident surface;
   a display panel, disposed adjacent to the first light guide plate, wherein the first light-emitting surface faces the display panel; and
   a transparent filling, connecting the display panel and the first light-emitting surface, wherein a refractive index of the transparent filling is smaller than a refractive index of the first light guide plate and smaller than or equal to a refractive index of a surface material of the display panel, wherein the first light source emits a first light beam into the first light guide plate through the first light-incident surface, and the first light beam is then emitted from the first light-emitting surface and transmitted to the display panel through the transparent filling.

2. The display device according to claim 1, wherein the first light-emitting surface has a plurality of optical microstructures.

3. The display device according to claim 1, further comprising a second light source module, comprising a second light source and a second light guide plate, wherein the second light guide plate comprises a second light-incident surface and a second light-emitting surface connected to the second light-incident surface, the second light-emitting surface faces the display panel, the display panel is positioned between the first light-emitting surface and the second light-emitting surface, and the second light source emits a second light beam into the second light guide plate through the second light-incident surface, and the second light beam is emitted from the second light-emitting surface and transmitted to the display panel.

4. The display device according to claim 3, wherein the second light-emitting surface has a plurality of optical microstructures.

5. The display device according to claim 3, wherein the transparent filling is further disposed between the display panel and the second light guide plate, and the transparent filling connects the display panel and the second light-emitting surface.

6. The display device according to claim 5, wherein the first light guide plate and the second light guide plate have a same material.

7. The display device according to claim 3, further comprising a control unit electrically connecting the first light source module and the second light source module, wherein the control unit respectively controls a switch and brightness of the first light source and the second light source.

8. The display device according to claim 1, wherein the display panel is a transmissive liquid crystal display panel, a semi-transmissive liquid crystal display panel, or an electrophoresis display panel.

9. The display device according to claim 1, wherein the transparent filling is in a liquid state, a gaseous state, a solid state, or a mixture thereof.

10. A display device, comprising:
    a first light source module, comprising a first light source and a first light guide plate, wherein the first light guide plate comprises a first light-incident surface and a first light-emitting surface connected to the first light-incident surface;
    a second light source module, comprising a second light source and a second light guide plate, wherein the second light guide plate comprises a second light-incident surface and a second light-emitting surface connected to the second light-incident surface;
    a display panel, disposed between the first light-emitting surface and the second light-emitting surface, wherein the first light-emitting surface and the second light-emitting surface face the display panel, wherein the first light source emits a first light beam into the first light guide plate through the first light-incident surface, and the first light beam is emitted from the first light-emitting surface and transmitted to the display panel, and the second light source emits a second light beam into the second light guide plate through the second light-incident surface, and the second light beam is emitted from the second light-emitting surface and transmitted to the display panel; and
    a transparent filling disposed between the first light guide plate and the display panel and between the second light guide plate and the display panel, wherein the transparent filling connects the display panel to the first light-emitting surface and the second light-emitting surface, wherein a refractive index of the transparent filling is smaller than refractive indices of the first light guide plate and the second light guide plate, and smaller than or equal to a refractive index of a surface material of the display panel.

11. The display device according to claim 10, wherein the first light-emitting surface and the second light-emitting surface both have a plurality of optical microstructures.

12. The display device according to claim 10, wherein the display panel is a transmissive liquid crystal display panel, a semi-transmissive liquid crystal display panel, or an electrophoresis display panel.

13. The display device according to claim 10, wherein the transparent filling is in a liquid state, a gaseous state, a solid state, or a mixture thereof.

14. The display device according to claim 10, wherein the first light guide plate and the second light guide plate have a same material.

15. The display device according to claim 10, further comprising a control unit electrically connecting the first light source module and the second light source module, wherein the control unit respectively controls a switch and brightness of the at least one first light source and the at least one second light source.

* * * * *